United States Patent [19]
Etani

[11] 3,947,362
[45] Mar. 30, 1976

[54] FILTER WITH AN OPEN-CELLED ELASTOMER FOAM

[76] Inventor: Kenji Etani, W. Meadow Road, West Townsend, Mass. 01474

[22] Filed: Oct. 25, 1974

[21] Appl. No.: 518,077

Related U.S. Application Data

[63] Continuation-in-part of Ser. No. 419,042, Nov. 26, 1973, abandoned.

[52] U.S. Cl. .............. 210/416; 210/457; 210/460; 210/497 R
[51] Int. Cl.² ........................................ B01D 35/00
[58] Field of Search .......... 210/167, 168, 169, 416, 210/441, 442, 445, 447, 453, 457, 462, 474, 484, 487, 489, 492, 497, 500, 460; 55/410, 503, 514, 522

[56] References Cited
UNITED STATES PATENTS

| | | |
|---|---|---|
| 3,212,242 | 10/1965 | Florine .................................. 55/522 |
| 3,321,088 | 5/1967 | Williamitis .......................... 210/497 |
| 3,572,390 | 3/1971 | McMichael .......................... 210/457 |
| 3,617,551 | 11/1971 | Johnston ............................... 210/22 |
| 3,647,083 | 3/1972 | Niccum et al. ..................... 210/457 |
| 3,675,777 | 7/1972 | Heskett et al. ...................... 210/497 |
| 3,785,494 | 1/1974 | Sama .................................. 210/169 |

Primary Examiner—Thomas G. Wyse
Assistant Examiner—F. F. Calvetti
Attorney, Agent, or Firm—Morse, Altman, Oates & Bello

[57] ABSTRACT

A liquid filter comprises an open cell, elastomeric foam body and a dimensionally stable gate. The foam body is formed with a central opening that defines an inlet surface through which a liquid to be filtered enters. The periphery of the foam body defines an outlet surface through which the filtered liquid exits.

4 Claims, 6 Drawing Figures

FILTER WITH AN OPEN-CELLED ELASTOMER FOAM

CROSS REFERENCE TO RELATED APPLICATION

The present application is a continuation-in-part of my copending application entitled Filter With Open-celled Elastomer Foam, Ser. No. 419,042, filed Nov. 26, 1973, now abandoned.

BACKGROUND OF THE INVENTION

1. Field of the Invention

The present invention relates to filtration products, processes and systems and, more particularly, to the utilization of an open cell, elastomeric foam as a filter medium for capturing the suspended constituents of a transmitted liquid to provide a clarified filtrate.

2. Description of the Prior Art

Difficulties have been encountered in utilizing an elastomeric foam as a liquid filter medium because of its tendency to deform and finally to collapse as a result of compression forces generated by the flow itself and/or by clogging of upstream regions.

SUMMARY OF THE INVENTION

The present invention takes advantage of the fact that, although an elastomeric foam is readily compressible, it is difficultly extensible. It has been found that while an elastomeric foam is transmitting a liquid, if the shape of its upstream surface is maintained, collapsing of the foam body can be avoided. It has also been found, that if the prefilt is fed at the center of an elastomeric foam and flows through the foam in a radial manner, the foam itself essentially maintains its original shape during filtration, since the forces at any point on the same radius are equal and cancel out each other in respect to the axis. The primary object of the present invention is to provide filter products, processes and systems, characterized by an open cell, elastomeric foam body and a dimensionally stable gate. The foam body is formed with a central opening that defines an inlet surface, an outlet surface of the foam body being positioned remotely from the inlet surface. The arrangement is such that forces within the foam body tend to maintain original shape and to deepen particle penetration.

Other objects of the present invention will in part be obvious and will in part appear hereinafter.

The invention accordingly comprises the products, processes and systems, together with their parts, steps, components and interrelationships, which are exemplified in the following detailed disclosure, the scope of which will be indicated in the appended claims.

BRIEF DESCRIPTION OF THE DRAWINGS

For a fuller understanding of the nature and objects of the present invention, reference is made to the following detailed description, taken in connection with the accompanying drawings, wherein.

DETAILED DESCRIPTION

Figure 1:
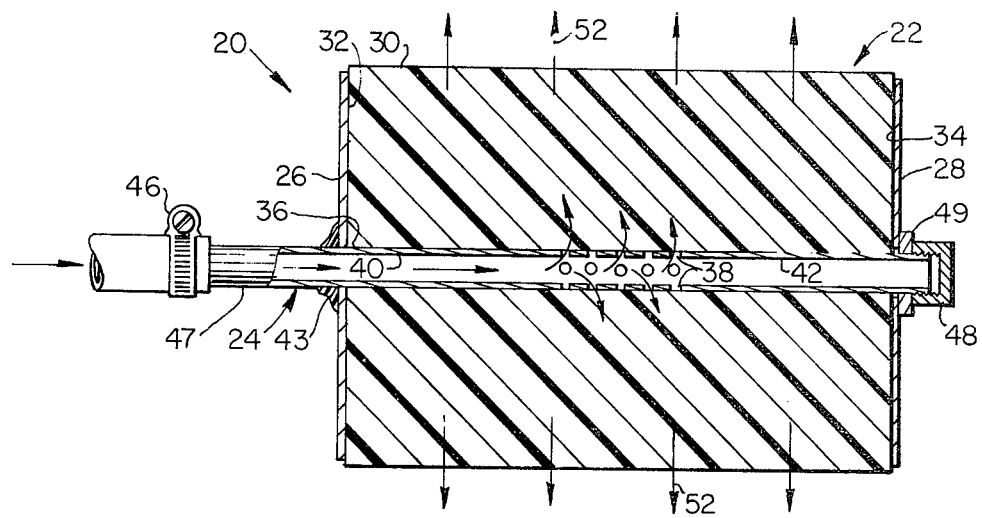
FIG. 1 is a cross-sectional view of a filter embodying the present invention.

Generally, each of the illustrated filters is shown as comprising: an elastomeric foam body that is characterized by open cells, which generally range from 10 to 400 in number per linear inch, and that is capable of transmitting a liquid therethrough from an inlet surface of a predetermined shape to an outlet surface remote therefrom; and a dimensionally stable gate, which is disposed in contiguity with an inlet surface of the foam body. In certain embodiments, a cement bond secures the gate at the inlet surface.

The contemplated filter is useful in connection with a variety of liquids, particularly water. In various arrangements, the liquid either is forced through the foam body by pressure pump at the stable gate or is drawn through the foam body by a suction pump at the outlet surface.

In the preferred embodiment, the elastomeric foam is selected from the class consisting of urethane polymers and vinyl polymers. Typically, the open cell elastomeric foam is produced at present either by chemical foaming or physical foaming of vinyl or urethane polymers, for example: a vinyl polymer such as polyvinyl chloride; or one of two types of polyurethane, for example, polyether based and polyester based. Preferably, the 25 percent indentation load deflection (ILD) value of the elastomeric foam is in the range of 1–200, the indentation load deflection value being pounds-force per 50 square inch required for 25 percent indentation as per ASTM D1564-71. Typically, the dimensionally stable gate is in the form of a conduit member or a reticulated member, either being composed of a polymer such as polystyrene, polyethylene or polyvinyl chloride or being composed of a metal such as steel or aluminum. Typically, the cement bond is applied as an adhesive containing a rubber, particularly a nitrile or chloroprene (Neoprene) rubber, dispersed in an organic solvent such as naphtha or toluol.

Large particle accumulations on the foam surface around the stable gate can be cleaned by a jet water stream or brush. If the foam body is not cement bonded to the gate, the entire body can be easily removed from the gate for washing. Typically, for cleaning, the foam body is immersed in water or soapy water, or in a trisodium phosphate solution in a laundry tub and squeezed in all directions to release captured dirt. It has been found that effective cleaning of the filter without deleterious effects on the polyurethane foam, particularly polyether polyurethane foam, is accomplished with an alkali metal hydroxide solution, e.g. sodium hydroxide (caustic soda) or potassium hydroxide solution, the solid content being no greater than ten percent by total weight. The alkali metal hydroxide solution dissolves and decomposes hair, fine debris, algae and other organic matter trapped by the filter without damaging the polyurethane foam. After detergent washing or caustic soda cleaning, the filter is rinsed by immersion in a receptacle and water is introduced into the inlet surface of the foam body, or in some embodiments, into the gate, for flushing of the foam body.

Figure 2:
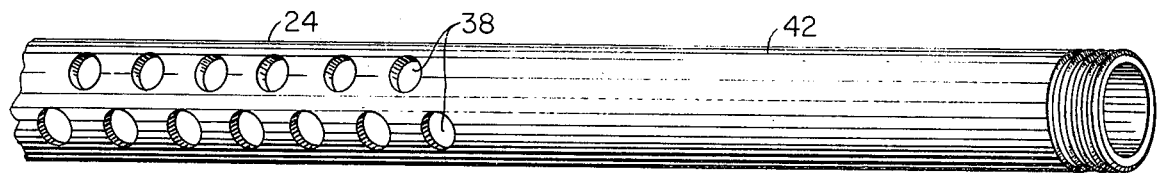
FIG. 2 is an enlarged, broken away detail view of a part of the filter of FIG. 1.

Referring now to the drawings, particularly FIG. 1, there is shown a liquid filter 20 comprising a relatively compliant elastomeric foam body 22, a relatively rigid reticulated tube member 24, and a pair of end plates 26, 28. Body 22 is in the form of a cylinder having a longitudinal cylindrical periphery 30 and a pair of flat end faces 32, 34. In the illustrated embodiment of FIG. 1, body 22 has approximately 100 cells per linear inch and has a 30 ILD value at 25% indentation. End plates 26 and 28, which are composed of a plastic, for example, polyvinyl chloride, polystyrene or polyethylene, are formed with through holes that are adapted to snugly receive tube 24. In one embodiment, end plate 26 and tube 24 are composed of a polyvinyl chloride, end plate 26 being secured to tube 24 by a cementitious weld 43, composed, for example, of a solvent cement containing polyvinyl chloride dissolved in tetrahydrofuran. When the foam body 22 is mounted on tube 24, it is held firmly and removably against each end plate. Reticulated tube member 24, which projects through an axial opening 36 in body 22, is composed, for example, of a plastic such as polystyrene polyvinyl chloride or polyethylene. The reticulations or apertures, as shown at 38 in FIG. 2, exist only at the medial portions of tube 24 and well within body 22. Solid portions 40 and 42 of tube 24 extend from within body 22 oppositely through end faces 32, 34 and end plates 26, 28. In order to prevent bypassing during the initial phase of filtration, the distance from end face 32 to the end of solid portion 40 within body 22 is equal to or greater than the radial distance from the outer surface of solid portion 40 to the periphery of body 22. Similarly, the distance from end face 34 to the end of solid portion 42 within body 22 is equal to or greater than the radial distance from the outer surface of solid portion 42 to the periphery of body 22. By-passing during filtration is further prevented by end plates 26 and 28, which cover end faces 32 and 34, respectively, of body 22. An inlet 47 of tube 24 is secured to the discharge side of a suitable pump (not shown) by a suitable fitting 46. The opposite extremity of tube 24 is closed by a suitable cap 48, for example an internally threaded cap that is turned into threads formed at the end of tube 24, a rubber gasket 49 is disposed between cap 48 and end plate 28 for pressing end plate 28 against end face 34.

In fabricating body 22, first axial opening 36 is produced readily by a hollow drill in the form of a rotating tube, the working extremity of which has an annular knife edge. Next, end plate 26, which is formed with a central opening that is slightly larger than the diameter of tube 24, is snugly fitted about one end of tube 24. Next, cementitious weld 43 is applied to tube 24 and end plate 26 to hold end plate 26 and tube 24 in fixed relationship. Next, tube 24 is inserted into axial opening 36 with the assistance of a suitable fixture (not shown). The fixture includes a bullet shaped head and a cylindrical body, the diameter of the head being the same as the outside diameter of tube 24 and the diameter of the body being the same as the inside diameter of tube 24. The body of the fixture is snugly received in the other end of tube 24. Next, the head of the fixture, which projects from tube 24, is turned into the central axial opening until end face 32 snugly abuts end plate 26, the fixture being operative to reduce the frictional force between tube 24 and central axial opening 36 during insertion. Next, the fixture is removed from tube 24 for repeated use. Then, using tube 24 as an axial guide, the cylindrical shape of body 22 of a given depth is easily cut from a foam medium by chromel wire heated electrically and stretched taut and drawn longitudinally through the foam medium. Finally, end plate 28 is fitted snugly against its end face 34. Opposite ends of tube 24 extend outwardly of the end plates. The flow direction of the fluid being filtered is shown by the arrows generally denoted by the reference character 52. In alternative embodiments, liquid filter has not end plates or has one end plate as shown in FIG. 3.

Figure 3:
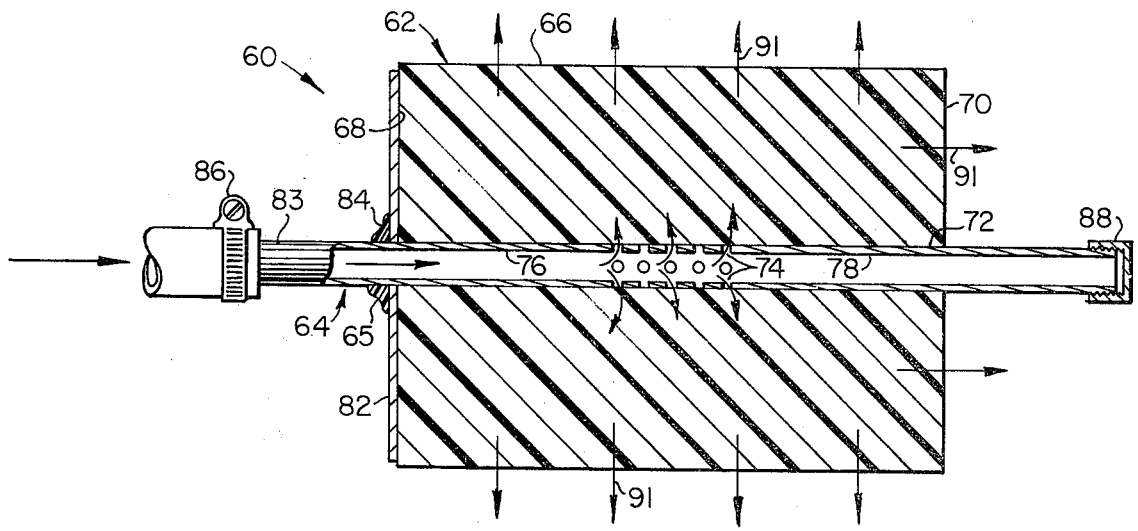
FIG. 3 is a cross-sectional view of an alternative embodiment of the present invention.

Referring now to FIG. 3, there is shown an alternative embodiment of filter 20 in the form of a liquid filter 60 comprising a relatively compliant elastomeric foam body 62 and a relatively rigid reticulated tube member 64. Body 62 is in the form of a cylinder defining a longitudinal cylindrical periphery 66, a pair of flat end faces 68, 70 and an axial opening 72 extending between the end faces. In the illustrated embodiment of FIG. 3, body 62 has approximately 100 cells per linear inch and has a 30 ILD value at 25% indentation. Reticulated tube member 64, which projects through axial opening 72, is composed, for example, of a plastic such as polystyrene, polyethylene or polyvinyl chloride. The reticulations or apertures, shown at 74, exist only at the medial portion of tube 64 and well within body 62. Solid portions 76 and 78 of tube 64 extend oppositely through end faces 68 and 70. An end plate 82, which either is composed of a plastic, such as polyvinyl chloride, polystyrene or polyethylene, or is composed of a metal such as steel or aluminum, is formed with a central opening 65 that is adapted to snugly receive tube 64. In one embodiment, end plate 82 and tube 64 are composed of a polyvinyl chloride and end plate 82 is held to tube 64 by a cementitious weld 84 that is composed of a solvent cement containing polyvinyl chloride dissolved in tetrahydrofuran. The distance from end face 68 to the end of solid portion 76 is equal to or greater than the radial distance from the surface of axial opening 72 to the periphery of body 62. The distance from end face 70 to the end of solid portion 78 is equal to or greater than the radial distance from the surface of axial opening 72 to the periphery of body 62. An inlet 83 of tube 64 is secured to the discharge side of a suitable pump (not shown) by a suitable fitting 86. In the illustrated embodiment, by way of example, the opposite extremity of tube 64 is externally threaded and closed by a suitable internally threaded cap 88. The flow direction of the fluid being filtered is shown by the arrows generally denoted by the reference character 91.

Figure 4:
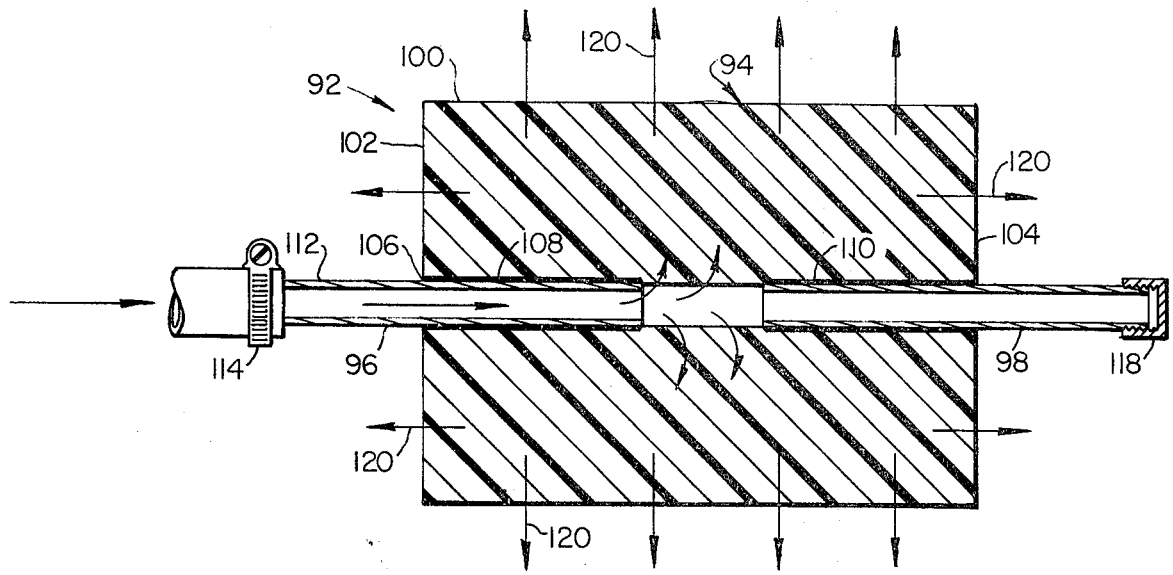
FIG. 4 is a cross-sectional view of another filter embodying the present invention.

Referring now to FIG. 4, there is shown a liquid filter 92 comprising a relatively compliant elastomeric foam body 94 and relatively rigid tube members 96, 98. Body 94 is in the form of a cylinder having a longitudinal cylindrical periphery 100, a pair of flat end faces 102, 104, and an axial opening 106 extending between end faces 102 and 104. In the illustrated embodiment of FIG. 4, body 94 has approximately 80 cells per linear inch and has a 35 ILD value at 25% indentation. Tubes 96 and 98 are composed, for example, of a plastic such as polystyrene, polyethylene or polyvinyl chloride. Tube 96 projects through end face 102 into one end of axial opening 106 and tube 98 projects through end face 104 into the opposite end of axial opening 106. A cement bond 108 is applied as an adhesive between the portion of tube 96 that is disposed within body 94 and the surface of axial opening 106 that is in registration therewith. A cement bond 110 is applied as an adhesive between the portion of tube 98 that is disposed within body 94 and the surface of axial opening 106 that is in registration therewith. Preferably, each cement bond 108 and 110 is an adhesive containing a rubber, particularly a nitrile or chloroprene (Neoprene) rubber, dispersed in an organic solvent such as naphtha or toluol. The distance from end face 102 to the end of tube 96 within body 94 is equal to or greater than the radial distance from central axial opening 106 to outer periphery 100. Similarly, the distance from end face 104 to the end of tube 98 within body 94 is equal to or greater than the radial distance from central axial opening 106 to outer periphery 100. An inlet 112 of tube 96 is secured to the discharge side of a suitable pump (not shown) by a suitable fitting 114. The opposite extremity of tube 98 is closed by a suitable cap 118. The flow direction of the fluid being filtered is shown by the arrows generally denoted by the reference character 120.

Figure 5:
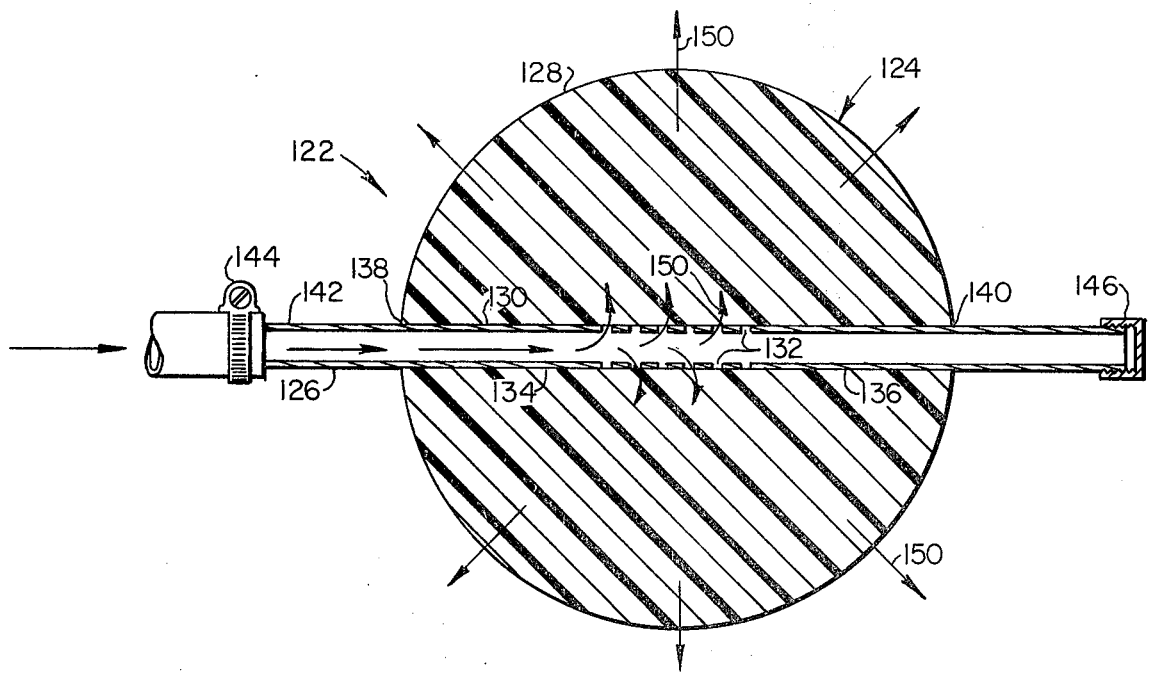
FIG. 5 is a cross-sectional view of a further filter embodying the present invention.

Referring now to FIG. 5, there is shown a liquid filter 122 comprising a relatively compliant exterior elastomeric foam body 124 and a relatively rigid reticulated tube member 126. Body 124 has a spherical periphery 128 and an axial opening 130. In the illustrated embodiment of FIG. 5, body 124 has approximately 60 cells per linear inch, and has a 35 ILD value at 25% indentation. Reticulated tube 126, which projects through axial opening 130, is composed, for example, of a plastic such as polystyrene, polyvinyl chloride or polyethylene. The reticulations or apertures, shown at 132, exist only at the medial portion of tube 126 and well within body 124. Solid portions 134 and 136 of tube 126 extend oppositely through diametrically opposed openings 138 and 140 at opposite ends of axial opening 130. An inlet 142 of tube 126 is secured to the discharge side of a suitable pump (not shown) by a suitable fitting 144. The opposite extremity of tube 126 is closed by a suitable cap 146. The flow direction of the fluid being filtered is shown by the arrows generally denoted by the reference character 150.

In any filter shown in FIGS. 1, 3, 4, or 5, the open area of the inlet surface is much smaller than, say at most ¼ of the outlet area of the foam body. Velocity of the liquid at the inlet surface is, therefore, very high. For example, the filter of FIG. 1 has an open area at the inlet surface that is about 1/40 of the outside cylindrical periphery area. The liquid velocity at the inlet is about 40 times greater than the liquid velocity at the cylindrical periphery. The velocity of the liquid through the filter is sufficiently slow to prevent forcing of the suspended particles through the foam body and to catch the suspended particles somewhere within the foam body. The velocity of the liquid at the inlet is sufficiently fast to force the suspended particles through the inlet into the interior of the foam body.

Figure 6:
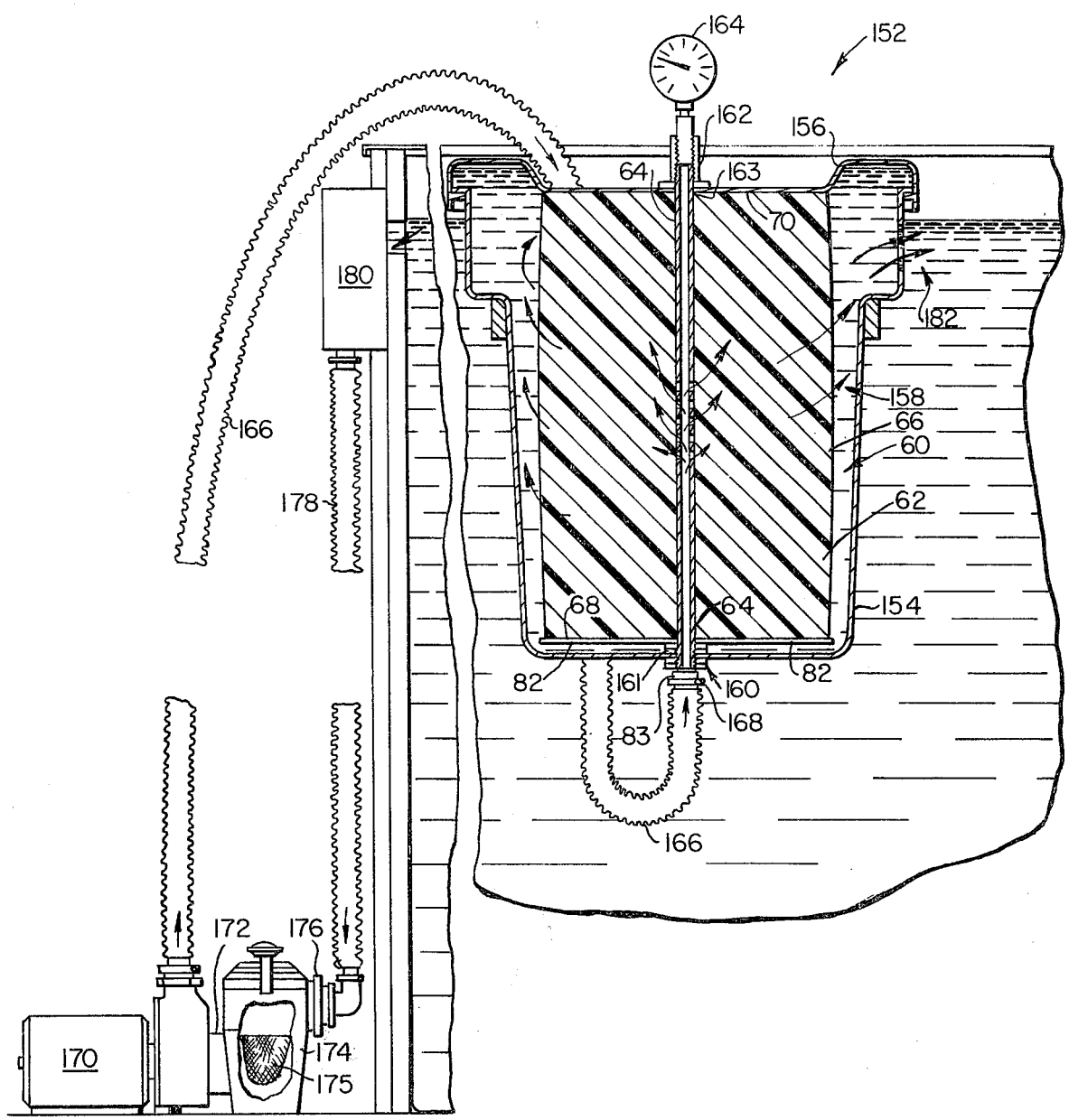
FIG. 6 is a schematic view of a filtration system incorporating the filter of FIG. 3.

FIG. 6 shows a filter system 152 for a swimming pool that is capable of utilizing the liquid filters illustrated in FIGS. 1, 3, 4 or 5. By way of example, filter system 152 is shown as incorporating the liquid filter depicted in FIG. 3. In alternative embodiments, the filters depicted in FIGS. 1, 4 and 5 are incorporated in filter system 152. Liquid filter 60 is mounted within an open ended container 154 that is molded from a plastic such as a rigid linear polyethylene. A suitable tank fitting 160 composed of a rigid plastic, for example a bulkhead fitting that is externally and internally threaded, is installed with rubber gaskets 161 at the bottom of container 154. Tube 64 is threaded and is turned into fitting 160 for interconnection with inlet 83.

The opened or upper end of container 154 is provided with a water tight snap-on cover 156. End face 70 is pressed against cover 156 and end face 68 is pressed against end plate 82 of tube 64 at the bottom of container 154, an annular cavity 158 being formed between periphery 66 of body 62 and the inner surface of container 154. Preferably, the longitudinal length of body 62 is slightly greater than the distance between cover 156 and end plate 82 at the bottom of container 154, whereby body 62 is slightly compressed to prevent by-passing of water. The upper end of tube 64 projects through a hole 163 formed in cover 156, the diameter of hold 163 being slightly larger than the diameter of tube 64. The projecting upper end of tube 64 is provided with a pressure gage 164 in lieu of cap 88. A rubber gasket 162 is disposed between pressure gage 164 and cover 156. In an alternative embodiment, pressure gage 164 is replaced with cap 88. One end of a flexible hose 166 is connected to inlet 83 by a suitable fitting 168. The other end of hose 166 is connected to the discharge port of a pump 170. An inlet port 172 of pump 170 is connected to an outlet port of a strainer 174, which includes a polyamide resin (Nylon) stocking 175 defining a pre-filter. An inlet port 176 of strainer 174 is connected to one end of a flexible hose 178, the other end of hose 178 being connected to a skimmer 180. Container 154 is provided with an outlet port 182 at the upper margin of its sidewall. For clarity in FIG. 6, liquid filter 60 is shown somewhat enlarged relative to pump 170, strainer 174, and skimmer 180.

In operation, water is forced by pump 170 through inlet 83 and body 62, the water being filtered as it passes radially and outwardly through body 62. The filtered water leaves container 154 via outlet port 182 and returns to the swimming pool. The water in the pool passes through skimmer 180 and strainer 174 to pump 170.

EXAMPLE

Two filter systems of the type shown in FIG. 6, each system including the filter configuration of FIG. 3, were tested in a 7,000-gallon swimming pool that contained algae filled pond water having a visibility less than 2 feet. The total filtration rate was approximately 24 gallons per minute. The pressure gage indicated, at different times during filtration, 2.0 to 4.5 pounds-force per square inch. The cylindrical body of each filter was composed of a polyether polyurethane foam having approximately 60 open cells per linear inch and having a 36 ILD value at 25% indentation. Each body had a 10 inch diameter and a twelve inch length. The plastic tube inserted into the axial opening of each body had a length of 14 inches and an outside diameter of 1 inch. Each tube had 28 perforations of 3/16 inch diameter distributed along a 2¼ inch length. The end plate was welded onto the tube for holding the filter body, the diameter of the end plate was approximately 8 inches.

After the pool was filled with water, a chlorinating compound and alum (aluminum potassium sulfate) were dissolved in water and poured into the pool and mixed well with the pool water. A few hours later, the alum, which is an agent for coalescing fine debris and algae into larger flakes, settled to the bottom of the pool. The settled flakes were then vacuumed and discarded as waste. The remaining portion of the settled flakes was filtered out. Some flakes passed through the filter and again settled to the bottom of the pool. The settled flakes were vacuumed and filtered. This process of vacuuming and filtering was performed several times. When the water had become quite clear, the polyurethane foam filters were washed, the water became crystal clear after 1–2 days.

Dirt accumulation on the internal surface of the filter was cleaned easily by a jet water stream, and dirt entrapped inside the filter was somewhat eliminated by squeezing the body from all directions with or without detergent, for example, trisodium phosphate. The most effective way found to restore the filter with dirt build-up inside was by a strong alkaline chemical solution, for example, a caustic soda solution. In one example, the polyurethane filter was immersed in a caustic soda solution of 2% by total weight. The caustic soda dissolved and decomposed hair, fine debris, algae and other organic matter trapped by the filter without damaging the polyurethane foam even after repeated use. Before reuse, the filter was thoroughly rinsed by introducing water into the center hole of the medium.

The present invention thus provides a filter capable of utilizing an open cell, elastomer foam as a filter medium for prolonged periods. Since certain changes may be made in the present disclosure without departing from the scope of the invention herein involved, it is intended that all matter shown in the accompanying drawings and described in the foregoing specification be interpreted in an illustrative and not in a limiting sense.

What is claimed is:

1. A liquid filter comprising an open cell, compressible elastomeric foam body and a tubular gate, said body formed with an axial opening, at least a portion of said gate disposed within said axial opening in contact with an interior surface of said body, said gate having an open end and a closed end, said open end constituting an inlet that is operative to receive a liquid to be filtered, said body characterized by open cells which range from 10 to 400 pores per linear inch of said foam body, said body capable of transmitting a liquid from said axial opening to an exterior surface of said body, said gate characterized by interspersed open and closed increments, said closed increments at the margins of said tubular gate, said closed increments imparting rigidity to said gate, a portion of said closed increments received within said axial opening a distance that is at least equal to a radial distance from a longitudinal axis of said axial opening to the exterior surface of said body, said inlet being a closed increment of said gate, said open increments disposed between said closed increments within said axial opening of said body, the entire periphery of said tubular gate disposed within said axial opening being in contact with said interior surface of said body, said open increments transmitting a liquid directed through said inlet to said interior surface of said body, a liquid entering said inlet being directed through said gate and passing outwardly through said open increments to said interior surface of said body, a filtered liquid exiting from the exterior surface of said body, said external exterior surface of said body being a compressible foam boundary, said body characterized by a 25 percent indentation load deflection value in the range of 1 to 200, the 25 percent indentation load deflection value being defined as pounds force per 50 square inch required for 25 percent indentation, said foam boundary being an integral continuum of said body and being supported substantially only by said gate means and said body, said elastomeric foam being composed of a material selected from the class consisting of urethane polymers and vinyl polymers.

2. The liquid filter as claimed in claim 1 wherein said liquid filter includes a bond between said gate and said body.

3. A filtration system comprising a pump and a liquid filter, said pump including a suction input and a discharge outlet, said liquid filter including an open cell, inwardly compressible elastomeric foam body and a tubular gate opened at one end and closed at an opposite end, said body formed with an axial opening, at least a portion of said gate disposed within said axial opening in contact with an interior surface of said body, said gate including an inlet at said opened end, a conduit connecting said inlet to said discharge outlet of said pump, said inlet operative to receive a liquid to be filtered, said body characterized by open cells which range from 10 to 400 pores per linear inch of said foam body and a 25 percent indentation load deflection value in the range of 1 to 200, the 25 percent indentation load deflection value being defined as pounds-force per 50 square inch required for 25 percent indentation, said body capable of transmitting a liquid from said axial opening to an exterior surface of said body, said gate characterized by interposed open and closed increments, said closed increments imparting rigidity to said gate, said inlet being a closed increment of said gate, said open increments disposed within said axial opening, said open increments transmitting a liquid directed from said discharge outlet of said pump through said inlet, a liquid entering said inlet being directed through said gate and passing outwardly through said open increments to said interior surface of said body, a filtered liquid exiting from an exterior surface of said body, said exterior surface of said body being an integral continuation of the interior compressible elastomeric foam of said body and thereby being inwardly compressible, said exterior surface being supported substantially only by said gate and said body, said elastomeric foam being composed of a material selected from the class consisting of urethane polymers and vinyl polymers.

4. The filtration system as claimed in claim 3 wherein said liquid filter includes a bond between said gate and said body.

* * * * *